United States Patent
Iwata et al.

(10) Patent No.: US 9,298,714 B2
(45) Date of Patent: Mar. 29, 2016

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Minato-ku, Tokyo (JP)

(72) Inventors: Nobuo Iwata, Kanagawa (JP); Yasuko Yamamoto, Kanagawa (JP); Yoko Nozaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/522,071

(22) Filed: Oct. 23, 2014

(65) Prior Publication Data

US 2015/0363412 A1    Dec. 17, 2015

(30) Foreign Application Priority Data

Jun. 11, 2014    (JP) ................................. 2014-120880

(51) Int. Cl.
  *G06F 17/00* (2006.01)
  *G06F 17/30* (2006.01)
  *G06K 1/12* (2006.01)
  *G06K 7/14* (2006.01)

(52) U.S. Cl.
  CPC .......... *G06F 17/30082* (2013.01); *G06K 1/121* (2013.01); *G06K 7/1447* (2013.01)

(58) Field of Classification Search
  CPC ........... G06F 17/00; G06F 7/00; G06K 19/00; G06K 7/10
  USPC .................................. 235/375, 376, 460, 487
  See application file for complete search history.

(56) References Cited

U.S. PATENT DOCUMENTS

| | | | | |
|---|---|---|---|---|
| 2008/0101700 | A1* | 5/2008 | Onishi et al. | 382/181 |
| 2009/0083735 | A1* | 3/2009 | Kimura | G06F 9/52 718/1 |
| 2009/0097062 | A1* | 4/2009 | Hayashi | G06F 3/1222 358/1.15 |
| 2010/0051683 | A1* | 3/2010 | Kudo et al. | 235/375 |
| 2014/0196134 | A1* | 7/2014 | Yamaguchi | G06F 21/44 726/7 |

FOREIGN PATENT DOCUMENTS

| | | |
|---|---|---|
| JP | 9274630 A | 10/1997 |
| JP | 2002-163269 A | 6/2002 |
| JP | 2004-234076 A | 8/2004 |
| JP | 201253856 A | 3/2012 |

OTHER PUBLICATIONS

Communication dated Sep. 29, 2015, issued by the Japan Patent Office in corresponding Japanese Application No. 2014-120880.

* cited by examiner

*Primary Examiner* — Edwyn Labaze
(74) *Attorney, Agent, or Firm* — Sughrue Mion, PLLC

(57) ABSTRACT

Provided is an information processing apparatus including a reception section that receives a request for a process relative to management of a publication, a code acquisition section that acquires plural codes affixed to the publication, a determination section that determines whether or not a code corresponding to the process is present in the plural acquired codes, and a process execution section that executes the process based on the code when it is determined that the code corresponding to the process is present.

18 Claims, 13 Drawing Sheets

| MANAGEMENT NUMBER | TITLE | ISBN | BOOK CLASSIFICATION CODE | CALL MARK (1) | CALL MARK (3) | LENDING FLAG | LENDING DATE | USER ID |
|---|---|---|---|---|---|---|---|---|
| | | | | | | | | |
| | | | | | | | | |
| | | | | | | | | |
| | | | | | | | | |
| | | | | | | | | |

222

| MANAGEMENT NUMBER | TITLE | ISSN | SERIES | IN-LIBRARY USE ONLY PERIOD | LENDING FLAG | LENDING DATE | USER ID |
|---|---|---|---|---|---|---|---|
| | | | | | | | |
| | | | | | | | |
| | | | | | | | |
| | | | | | | | |
| | | | | | | | |

223

| BOOK CLASSIFICATION | CALL MARK (1) |
|---|---|
| | |
| | |
| | |
| | |
| | |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-120880 filed Jun. 11, 2014.

BACKGROUND (i) Technical Field

The present invention relates to an information processing apparatus, an information processing system, and a non-transitory computer readable medium.

(ii) Related Art

A structure in which publications, such as books and magazines, are managed using a computer has been known.

SUMMARY

According to an aspect of the invention, there is provided an information processing apparatus including:

a reception section that receives a request for a process relative to management of a publication;

a code acquisition section that acquires plural codes affixed to the publication;

a determination section that determines whether or not a code corresponding to the process is present in the plural acquired codes; and a process execution section that executes the process based on the code when it is determined that the code corresponding to the process is present.

BRIEF DESCRIPTION OF THE DRAWINGS

Exemplary embodiments of the present invention will be described in detail based on the following figures, wherein:

FIG. 4 is a diagram illustrating an example of data stored in the server apparatus;

DETAILED DESCRIPTION

First Exemplary Embodiment

Configuration

Figure 1:
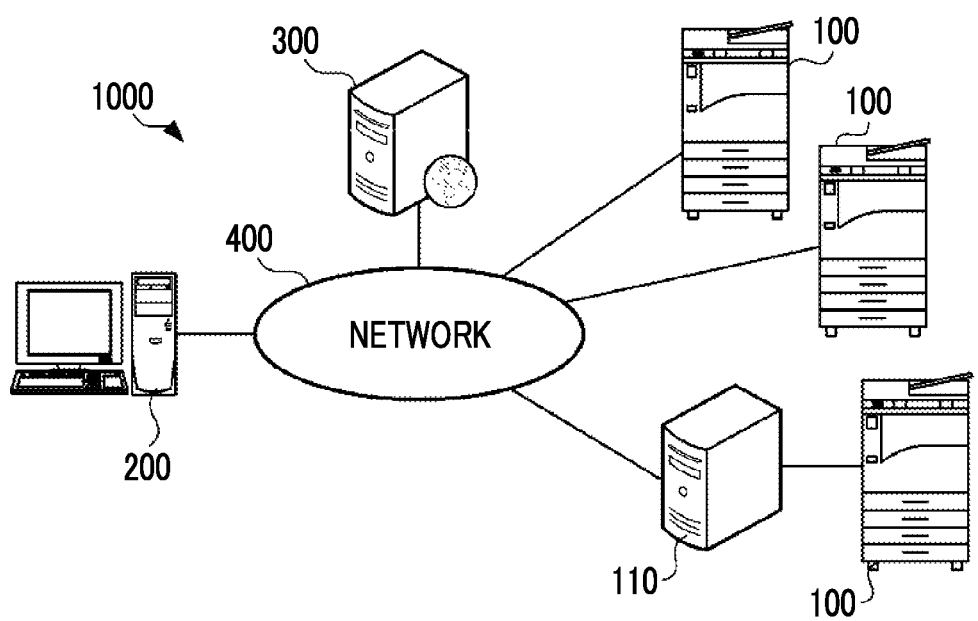
FIG. 1 is a block diagram illustrating the configuration of an information processing system according to a first exemplary embodiment of the present invention.

Hereinafter, exemplary embodiments of the present invention will be described. FIG. 1 is a block diagram illustrating the configuration of an information processing system 1000 according to an exemplary embodiment of the present invention. The information processing system 1000 is a system for managing a publication. The publication is generally classified into a book and a magazine. Although the book is a publication which has a publication state completed with one volume written by one person or plural authors or editors, the book may include a survey or a complete collection published in series. In contrast, the magazine is a publication which is periodically and continuously published with the same title and to which a volume (series), a volume number, a part, a copy number, and the like are assigned. An ISBN (for example, 10 digits or 13 digits) is assigned to the book and an international standard number, called ISSN (for example, 8 digits or 13 digits), is attached to the magazine.

The information processing system 1000 includes an image processing apparatus 100 which is installed in, for example, a library, a server apparatus 200 which is managed by, for example, a manager of the library, a bibliography information storage apparatus 300 which is managed by, for example, a manager of the National Diet Library or a bibliography information provision site, and a network 400 which connects the apparatuses 100 to 300. The image processing apparatus 100 is so-called a multi-function machine which has an image reading function and an image forming function. The server apparatus 200 interprets an image which is read by the image processing apparatus 100, acquires bibliography information from the bibliography information storage apparatus 300, and executes a process relative to the management of the publication. The process relative to the management of the publication includes at least any one of a process to register or remove the publication in or from a database in the server apparatus 200, a process to update the database in order to lend the publication, and a process to update the database in order to return the lent publication. The bibliography information storage apparatus 300 is a Web server apparatus which stores the bibliography information of a huge number of publications and provides the bibliography information through the network 400. The network 400 includes various kinds of networks such as a Local Area Network (LAN), an Intranet, a Virtual Private Network (VPN), and the Internet. The number of each of the image processing apparatus 100, the server apparatus 200, and the bibliography information storage apparatus 300 is not limited to the example shown in FIG. 1. Meanwhile, the function of the server apparatus 200 may be implemented by anyone of the image processing apparatuses 100 or may be implemented by an information processing apparatus 110 which is connected to any one of the image processing apparatuses 100 as a front-end device. In addition, the function of the server apparatus 200 may be distributed to plural server apparatuses, and each of the server apparatuses may share and execute the same function as that of the server apparatus 200. The function of the server apparatus 200 may be provided as a so-called cloud service. In addition, the configurations (the image processing apparatus 100, the server apparatus 200, and the information processing apparatus 110) other than the bibliography information storage apparatus 300 may be mounted in a single apparatus.

Figure 2:
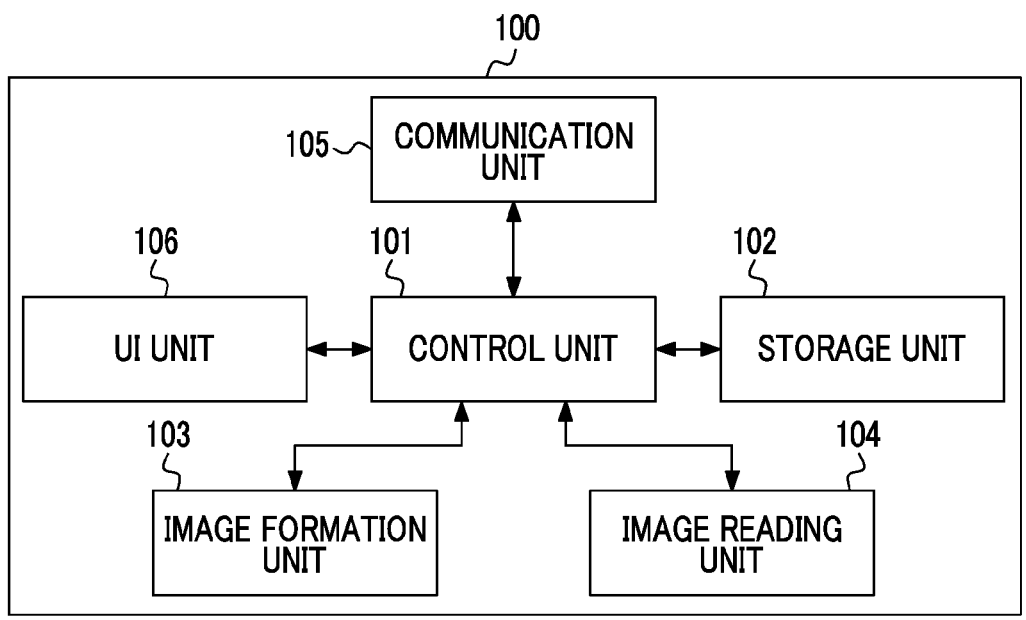
FIG. 2 is a block diagram illustrating the configuration of the image processing apparatus according to the exemplary embodiment.

FIG. 2 is a block diagram illustrating the configuration of the image processing apparatus 100. The image processing apparatus 100 is an information processing apparatus which includes a control unit 101, a storage unit 102, an image formation unit 103, an image reading unit 104, a communication unit 105, and a User Interface (UI) unit 106. The control unit 101 is a section which controls each of the units of the image processing apparatus 100 and includes, for example, a control circuit, such as an Application Specific Integrated Circuit (ASIC) or a Central Processing Unit (CPU), and various types of memory. The storage unit 102 is, for example, a storage section such as a hard disk, and stores data which is used in association with a non-transitory computer readable medium executed by the CPU or the execution of the non-transitory computer readable medium. The image formation unit 103 is, for example, a section which forms an image on a medium in an electrophotographic manner, forms a latent image by irradiating an image holding member, such as a photoreceptor, with laser beams, transfers the latent image on the medium, such as a record sheet, by developing the latent image using toners having respective colors, such as Yellow (Y), Magenta (M), Cyan (C), and black (K), and discharges the medium through a fixing process. The image reading unit 104 is a section which generates image data by optically reading an image on a manuscript. The communication unit 105 is a section which transmits and receives data, and performs communication with the server apparatus 200 through the network 400. The UI unit 106 is a section which realizes conversation with a user, and includes, for example, an operation unit which includes operators, such as keys and touch sensors, and which supplies an operation signal according to the operation of the user to the control unit 101, and a display unit which includes, for example, a liquid crystal panel or a liquid crystal driving circuit and which displays an image under the control of the control unit 101.

Figure 3:
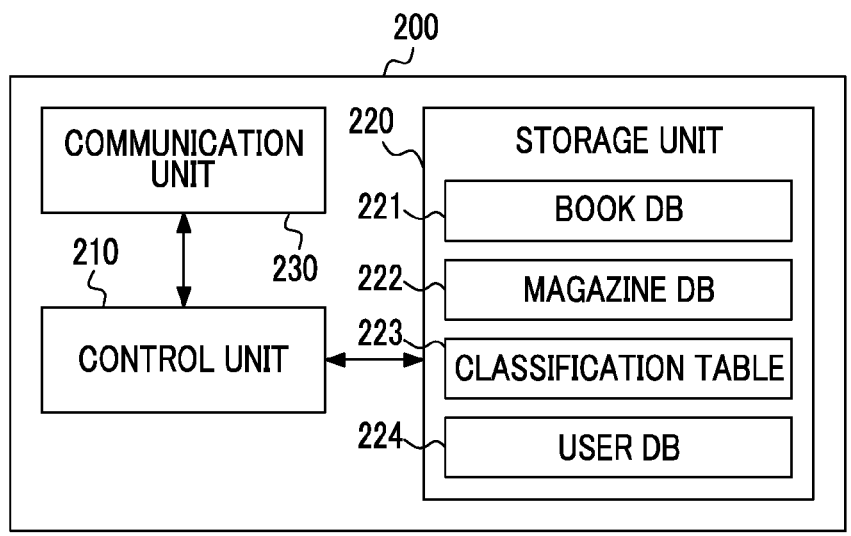
FIG. 3 is a block diagram illustrating the configuration of a server apparatus according to the exemplary embodiment.

FIG. 3 is a block diagram illustrating the configuration of the hardware of the server apparatus 200. The server apparatus 200 includes a control unit 210, a storage unit 220, and a communication unit 230. The control unit 210 is a section which controls the operation of each of the units of the server apparatus 200. The control unit 210 includes a control circuit, such as the CPU, and various types of memories, and controls the operation of each of the units of the server apparatus 200 by executing a non-transitory computer readable medium. The storage unit 220 is a section which stores data to be used in the server apparatus 200. The storage unit 220 is, for example, a hard disk, and stores data which is used in association with the non-transitory computer readable medium executed by the control unit 210 or the execution of the non-transitory computer readable medium. Here, the storage unit 220 stores a book Data Base (DB) 221, a magazine DB 222, a classification table 223, and a user DB 224. The communication unit 230 is a section which transmits and receives data, and performs communication with the image processing apparatus 100 and the bibliography information storage apparatus 300 through the network 400.

FIG. 4 is a diagram illustrating some parts of the content of the book DB 221, the magazine DB 222, and the classification table 223 which are stored in the server apparatus 200. In the book DB 221, a management number is identification information for identifying books, which belong to a library, one by one. A title is the title of the book. When there are plural books which have the same title, different management numbers are respectively assigned thereto. An ISBN is an international standard number which is assigned to the book. A book classification code is standard classification based on the subject or the content of the book, and Nippon Decimal Classification (NDC9) has been known in Japan. A call mark (1) is book classification which is used in each library. The Nippon Decimal Classification or classification, which is uniquely determined by a library, is used as the call mark (1). Generally, in a library, the shelving location of each book and an alignment sequence on a bookshelf are determined based on the book classification. Therefore, the shelving location of each book and the alignment sequence on the bookshelf are specified using the call mark (1) in the library. A call mark (3) is classification, such as the volume number or the year of publication of each book, of a survey and a complete collection published in series. The call mark (3) is a serial number within the call mark (1), and the same number is generally used as a serial number in a case of the same title. A lending flag is a flag which indicates whether or not a book is being lent. A lending date is a date at which a book is lent when the book is being lent. A user ID is identification information of a user who borrowed a book when the book is being lent.

Each piece of data included in the magazine DB 222 may be understood by replacing "book" of the above-described book DB 221 with "magazine". Meanwhile, the magazine DB includes an in-library use only period during which lending is forbidden from the date of publication of the magazine.

The classification table 223 indicates the correspondence relation between the book classification code which is standard book classification and call mark (1) which is the library's own book classification. With the classification table, it is possible to convert the standard book classification code, such as the NDC9, into the call mark (1) which is used in the library. The user DB 224 is a database which includes a user ID allocated to the user or the attribute of the user.

Figure 5:
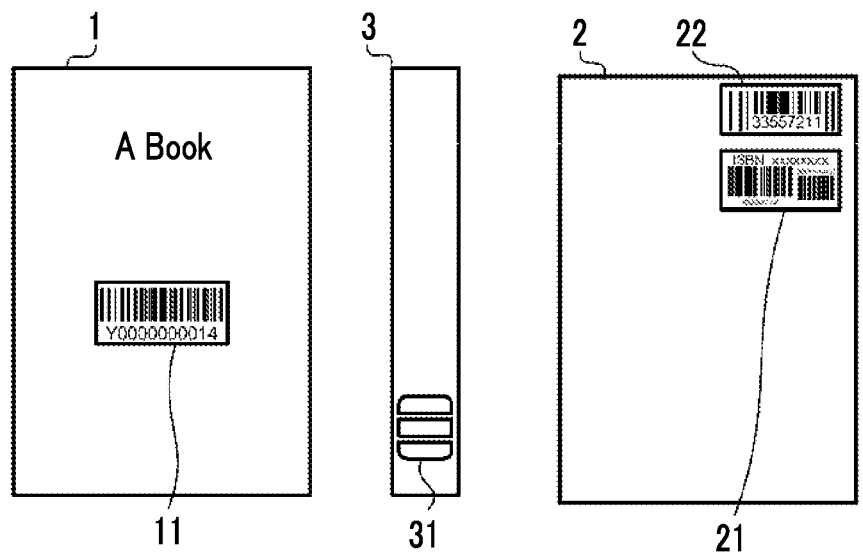
FIG. 5 is a diagram illustrating the appearance of a book.

FIG. 5 is a plan view illustrating an example of the appearance of a publication. In the example of FIG. 5, a management bar code 11 which indicates the management number is attached to a cover 1 of the publication. The management bar code 11 is identification information, which is capable of identifying the publication one by one, as described above. Further, the management number is, for example, "YB000123" in a case of a book, and the management number is, for example, "YM0000123" in a case of a magazine. That is, a book and a magazine may be allowed to be identified based on the management number using an identifier "YB", which means a book, and an identifier "YM", which means a magazine, as a part of the management number. In addition, although the management bar code 11 is attached to the cover 1 in the example, the management bar code 11 may be attached to a spine cover 3 or a back cover 2.

An ISBN bar code 21 which means an ISBN assigned to the publication (in a case of a book), an ISSN bar code 21 which means an ISSN (in a case of a magazine), and a price bar code 22 which indicates the price of the publication are printed on or attached to the back cover 2 of the publication. A label 31 is attached to the spine cover 3. The label is displayed with three-stage configuration, the call mark (1) is written in the uppermost stage, and the call mark (3) is written in the lowermost stage.

Figure 6:
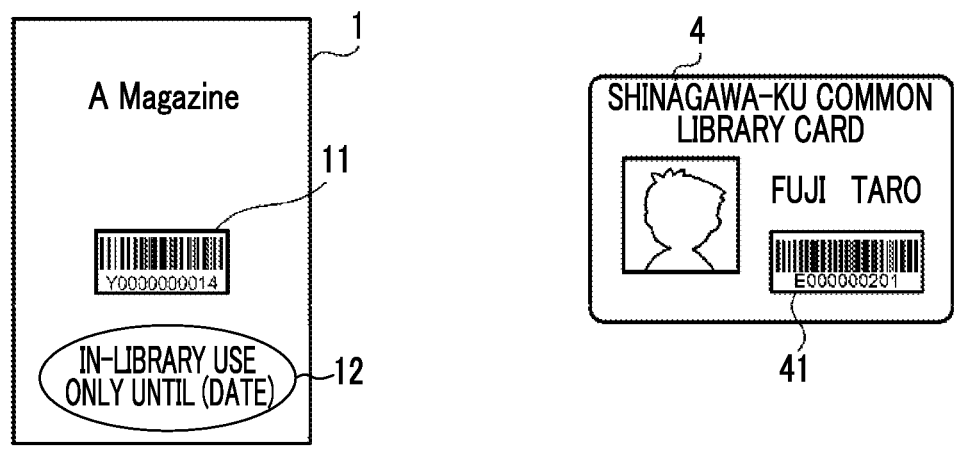
FIG. 6 is a diagram illustrating the appearances of a magazine and a user card.

In the case of the magazine, an in-library use only label 12, which means the in-library use only period, is attached to the cover 1 or the like of the magazine (refer to FIG. 6). When the publication is lent, lending is performed for only a user who possesses a user card 4 shown in FIG. 6. A user ID bar code 41, which indicates a user ID for identifying each user, is printed on or attached to the user card 4.

Meanwhile, a format, which is used when the various pieces of information are expressed, is not necessarily a bar code, and a code acquired by encoding each of the pieces of information may be used.

Figure 7:
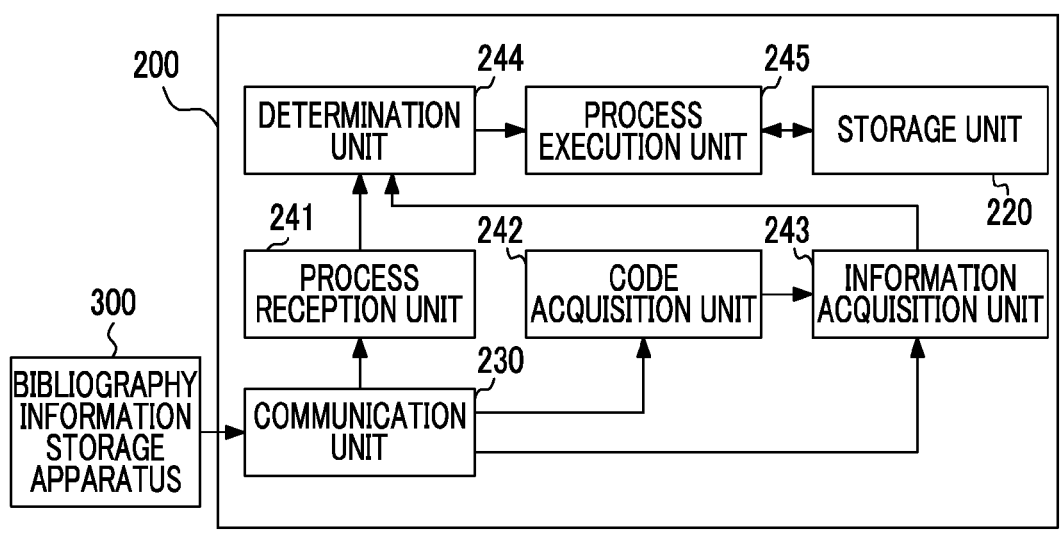
FIG. 7 is a diagram illustrating the functional configuration of the server apparatus.

FIG. 7 is a diagram illustrating the functional configuration of the server apparatus 200. The server apparatus 200 includes the functions of the communication unit 230, a process reception unit 241 which receives a request for a process relative to the management of the publication, a code acquisition unit 242 which acquires codes attached to the publication, an information acquisition unit 243 which acquires information specified by the plural acquired codes, a determination unit 244 which determines whether or not a code corresponding to the process is present from among the plural acquired codes, a process execution unit 245 which executes the process based on the code (information specified by the code) when it is determined that the code corresponding to the process is present, and the storage unit 220. The process relative to the management of the publication includes at least one of a process to register/remove the publication in/from the database in the server apparatus 200, a process to update the database in order to lend the publication, and a process to update the database in order to return the lent publication, as described above. For example, in a case of the process to register the publication in the database, the process execution unit 245 includes a section which registers acquired information in the storage unit 220, a section which generates a code to be affixed to the publication based on the registered information, and a section which forms the generated code on a medium using the image formation unit 103. The process reception unit 241, the code acquisition unit 242, the information acquisition unit 243, the determination unit 244, and the process execution unit 245 are realized through a software process performed by the control unit 210. In addition, the code affixed to the publication includes a code, which is fixed to the publication in a detachable state, in addition to a code to be printed on the publication or a code attached to the publication. Meanwhile, the code is the system of a sign and a mark to express information, and a call mark is included in the exemplary embodiment in addition to various bar codes and QR codes (registered trademark).

Operation

Figure 8:
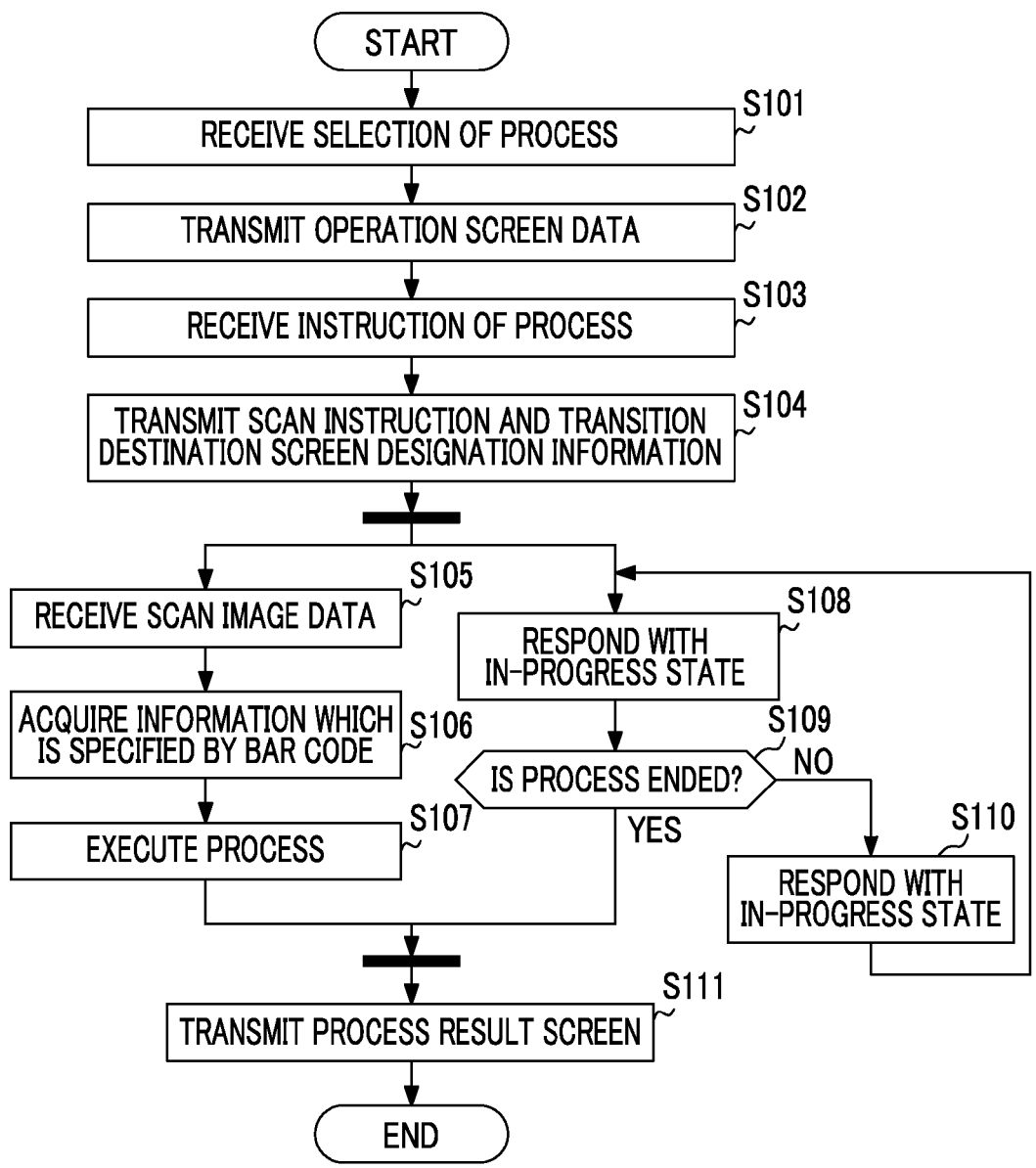
FIG. 8 is a flowchart illustrating the basic operation of the server apparatus.
Figure 9:
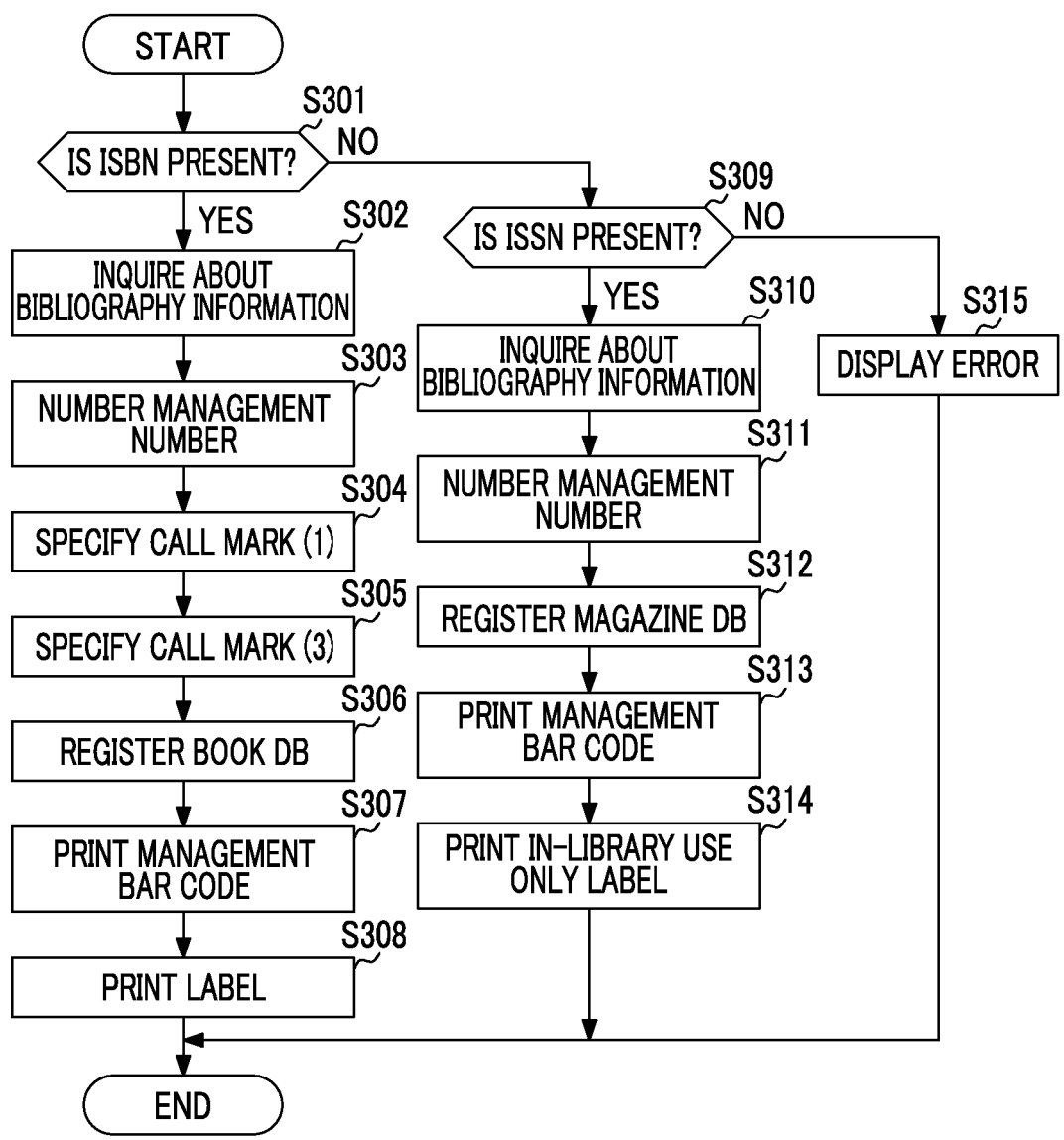
FIG. 9 is a flowchart illustrating the operation of the server apparatus when a database is registered.
Figure 10:
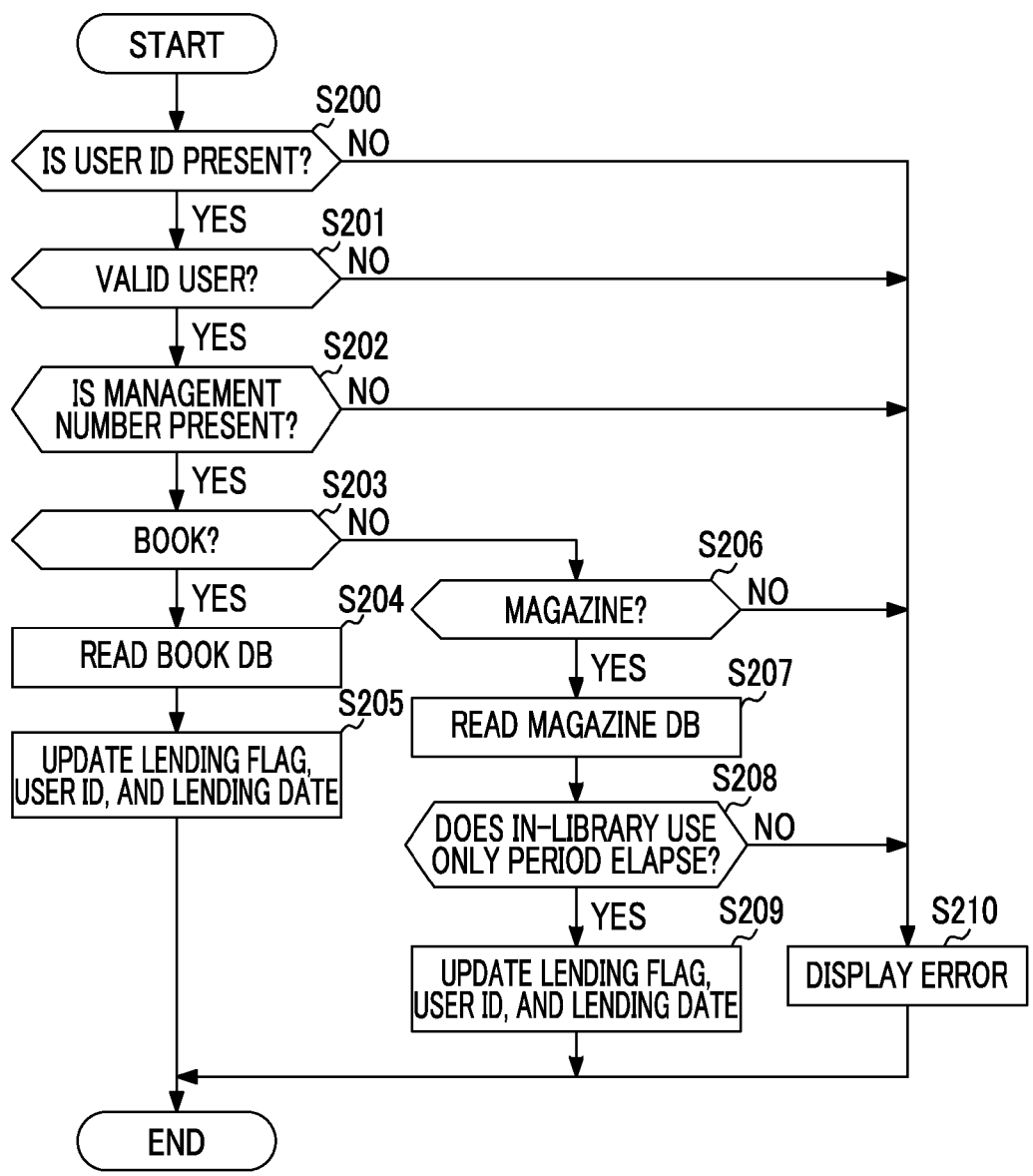
FIG. 10 is a flowchart illustrating the operation of the server apparatus when a book is lent.
Figure 11:
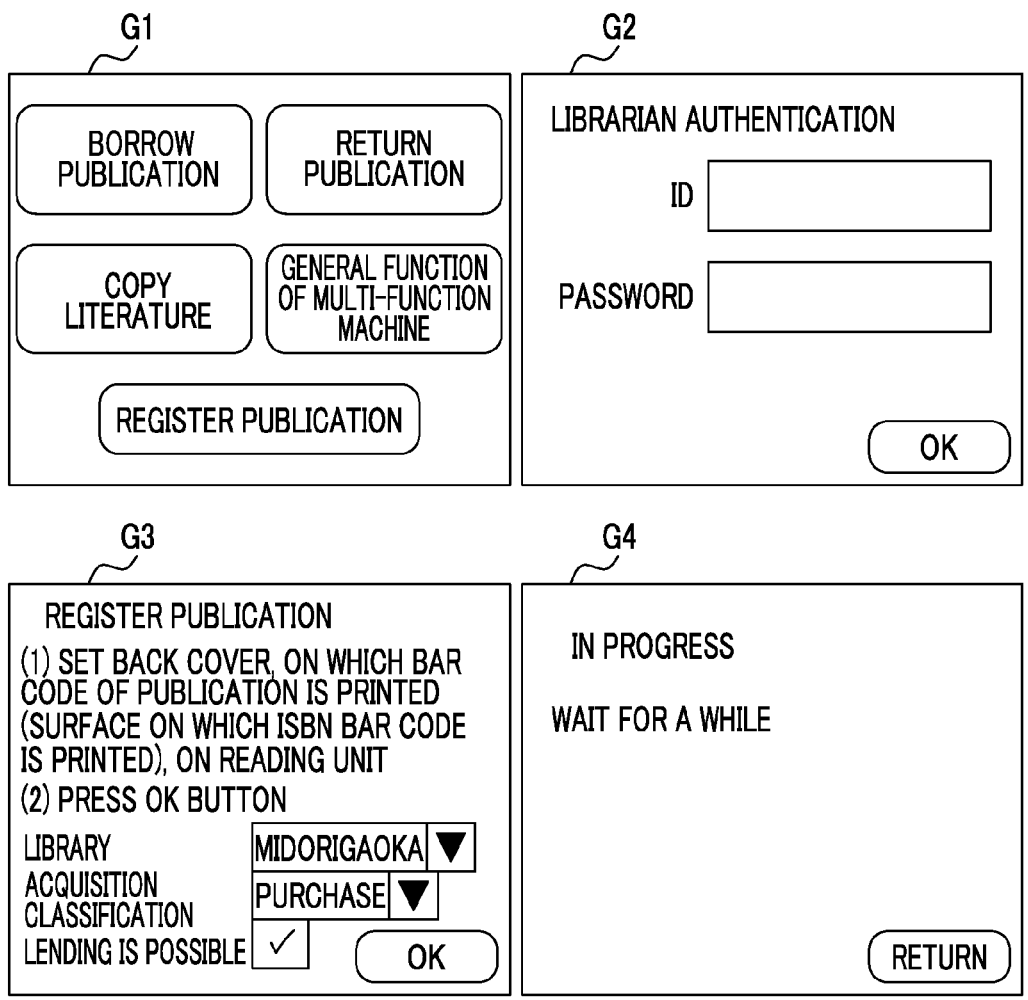
FIG. 11 is a diagram illustrating an example of a screen displayed on the image processing apparatus.
Figure 12:
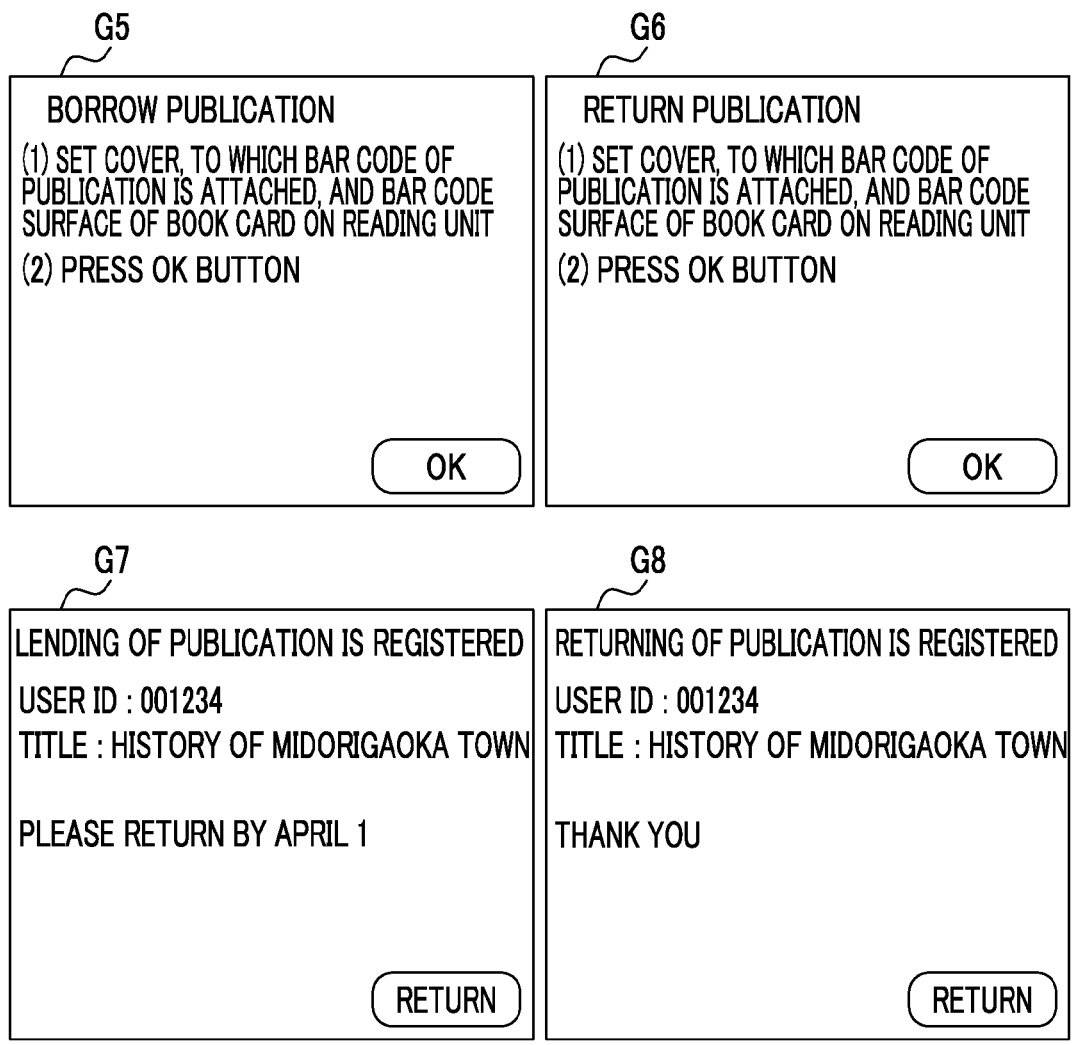
FIG. 12 is a diagram illustrating an example of a screen displayed on the image processing apparatus.
Figure 13:
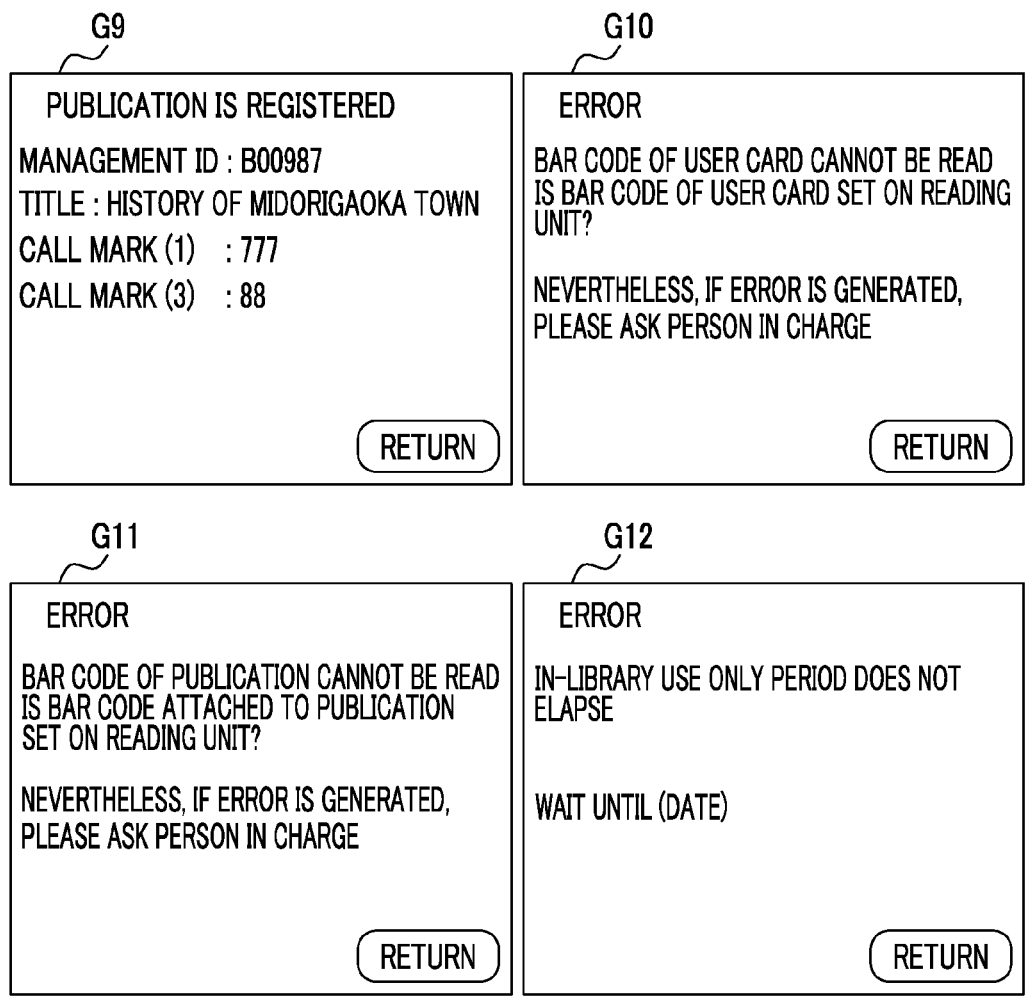
FIG. 13 is a diagram illustrating an example of a screen displayed on the image processing apparatus.

FIGS. 8 to 10 are flowcharts illustrating the operation of the server apparatus 200, and FIGS. 11 to 13 are diagrams illustrating examples of a screen which is displayed on the image processing apparatus 100. FIG. 8 illustrates the basic operation of the server apparatus 200, and FIGS. 9 and 10 illustrate a detailed process in step S107 of FIG. 8.

Basic Operation

First, a process selection screen G1 shown in FIG. 11 is displayed in the UI unit 106 of the image processing apparatus 100. A user selects a desired process on the process selection screen G1. From among soft buttons on which processes to "borrow a publication", "return the publication", "copy document" and "register the publication", and "general function of multi-function machine" are written as shown in FIG. 11, Uniform Resource Locators (URLs) are respectively associated with the soft buttons of "borrow the publication", "return the publication", and "register the publication". When the user selects any one of the processes to "borrow the publication", "return the publication", and "register the publication", the control unit 101 of the image processing apparatus 100 transmits a Hyper Text Transfer Protocol (HTTP) request to the URL which is associated with the selected process. In contrast, when the process to "copy document" is selected by the user, the control unit 101 of the image processing apparatus 100 reads screen data, which is used to perform so-called copying, from the storage unit 102, and displays a screen according to the data on the UI unit 106. In addition, when "general function of multi-function machine" is selected, the control unit 101 of the image processing apparatus 100 reads data, which is used to display a general menu screen listed with options, such as copy, scan, and facsimile, on the multi-function machine, from the storage unit 102, and displays the screen on the UI unit 106. Meanwhile, all of the above-described processes may not be provided to all users. That is, some processes among all of the processes may be provided to the all users, and the other processes may be provided to only specific users. At this time, a method for authenticating a user before the process screen G1 is displayed and then displaying the process screen G1 displayed with a process which may be used by the authenticated user, or a method for displaying the process screen G1 displayed with a process which may be used by all of the users at first and then displaying a process which may be used by the authenticated user after authenticating is performed may be considered. A normal user and a specific user may change the display screen itself. For example, setting may be performed such that the process to "register the publication" is provided to only a librarian. The process to "register the publication" is not displayed on the process screen G1 for the normal user, the control unit 101 reads data, which is used to display a librarian-dedicated process selection screen, from the storage unit 102 after the authentication is successful using an ID and a password on the librarian-dedicated login screen G2, and displays a screen, which includes the soft button on which "register the publication" is written, on the UI unit 106.

Here, a case in which the user performs an operation to select any one of the processes to "borrow the publication", "return the publication", and "register the publication" in the image processing apparatus 100 will be described as an example. In this case, the control unit 101 of the image processing apparatus 100 transmits an HTTP request to an URL which is associated with the selected process. The URL is the URL of the server apparatus 200, and the control unit 210 of the server apparatus 200 receives the selection of the process by accepting the HTTP request in step S101 of FIG. 8. Further, the control unit 210 reads an operation screen data according to the HTTP request from the storage unit 220 and transmits the operation screen data to the image processing apparatus 100 in step S102.

The control unit 101 of the image processing apparatus 100 displays an operation screen according to the received operation screen data on the UI unit 106. For example, when a library newly acquires the publication and registers the publication, a registration screen G3 (FIG. 11) is displayed on the UI unit 106. When a publication, which is newly acquired in a library, is lent (the user borrows the publication), a lending process screen G5 (FIG. 12) is displayed on the UI unit 106. When the user returns the publication, a returning process screen G6 (FIG. 12) is displayed on the UI unit 106. When the publication is registered, the back cover 2 on which the ISBN bar code 21 of the publication is printed is set for the image reading unit 104 of the image processing apparatus 100, necessary information is input to an input box which is provided on the registration screen G3, and then a soft button, on which "OK" is written (hereinafter, called an OK button), is selected. Therefore, the identifier of the OK button, information about the value thereof, and information which is input to the input box are transmitted to the URL associated by the FORM tags of a Hyper Text Markup Language (HTML) on the registration screen. In addition, when the publication is lent or returned, the user sets the cover 1 of the publication to which the management bar code 11 is attached and the surface of the user card 4 on which the user ID bar code is printed on platen glass which is included in the image reading unit 104 of the image processing apparatus 100, and selects an OK button on the lending process screen G5 or the returning process screen G6. Therefore, the image reading unit 104 reads the plural codes from one publication on the platen glass at one scan. At this time, plural publications are placed on the platen glass at the same time and codes may be read from the plural publications at one scan. In addition, the user card is also placed on the platen glass and codes may be read from the user code. The identifier of the OK button and information about the value thereof are transmitted to the URL associated by the FORM tags of the HTML on the screens. The control unit 201 of the server apparatus 200 receives an instruction of process by accepting the pieces of information in step S103. Meanwhile, setting may be performed such that hard buttons provided in the image processing apparatus 100 receive the same instructions as the soft buttons. In addition, the hard buttons of the image processing apparatus may substitute for the functions of the soft buttons without displaying the soft buttons on the UI unit 106.

The control unit 210 of the server apparatus 200 transmits a scan instruction and transition destination screen designation information to the image processing apparatus 100 in step S104. The scan instruction includes parameters, which are used when scanning is performed, such as the resolution of the scan (for example, 300 dpi (dot/inch)), monochrome, and an image format (for example, the TIFF format), and an URL which indicates the destination of scan image data. The transition destination screen designation information is path information such as the URL which means the storage destination of screen data.

The control unit 101 of the image processing apparatus 100 reads an image using the image reading unit 104 according to the received scan instruction, and generates image data according to a parameter designated by the server apparatus 200. The control unit 101 transmits the generated image data to a designated destination. The control unit 101 adds meta information (authenticated user information, the address of the image processing apparatus, and the like) to the scan image data in addition to the parameters acquired when scanning is performed, if necessary.

The control unit 210 of the server apparatus 200 receives the scan image data which is transmitted from the image processing apparatus 100 in step S105. Further, the control unit 210 acquires information which is specified by the bar codes included in the scan image data in step S106. When the plural bar codes are included in the scan image data, the control unit 210 acquires the plural pieces of information which respectively correspond to the bar codes. Further, the control unit 210 determines whether or not it is possible to execute a process using the acquired information. When it is determined that it is possible to execute the process, the control unit 210 executes the process based on the acquired information in step S107. The details of each process will be described later.

In steps S105 to S107, the control unit 101 of the image processing apparatus 100 designates an URL which is designated based on the transition destination screen designation information, and requests a state display screen from the server apparatus 200. When the process in step S107 is not completed in step S109 (No), the control unit 210 of the server apparatus 200 transmits in-progress screen data (in-progress screen G4 of FIG. 11) to the image processing apparatus 100 in steps S108 and S110. In addition, the control unit 210 transmits normal ending screen data (process result screens G7 and G8 of FIG. 12 and a process result screen G9 of FIG. 13) when the process in step S107 normally ends in step S109 (Yes), and transmits an error screen (process result screens G10, G11 and G12 of FIG. 13) to the image processing apparatus 100 when the process is erroneously ended in step S111.

Registration Operation

Subsequently, the process in step S107 (FIG. 8) performed when the publication is registered will be described with reference to FIG. 9. The control unit 210 of the server apparatus 200 decodes one or more bar codes which are included in the scan image data, and acquires one or more pieces of information which are specified from the respective bar codes. It is determined whether or not a character string indicative of the ISBN is included in the information in step S301. In order to identify various pieces of information, such as the ISBN, the ISSN, a user ID, and the management number of a book or a magazine, a method for determining the various pieces of information using respective prefixes may be considered. More specifically, the ISBN is a 13-digit numerical value which starts with 987, the ISSN is a 13-digit numerical value which starts with 977, the user ID starts with, for example, a specific prefix, such as A (for example, A0012345), the management number of a book starts with, for example, a specific prefix, such as YB (for example, YB00012), and the management number of a magazine starts with, for example, a specific prefix, such as YM (for example, YM0002222). The control unit 210 determines the type of the information based on the prefixes. In addition, the number of digits of each piece of information or a so-called check digit may be used. In addition, the type of the information may be determined based on the type of the bar code or may be determined based on the peripheral image (guide image or the like) of the bar code or the location of the bar code.

When the ISBN is acquired in step S301 (Yes), the control unit 210 designates the ISBN and inquires about bibliography information from the bibliography information storage apparatus 300 in step S302. When the bibliography information is acquired, the control unit 210 numbers the management number in step S303. The control unit 210 specifies the call mark (1) corresponding to the book classification code included in the acquired bibliography information with reference to the classification table 223 in step S304. Subsequently, the control unit 210 specifies the call mark (3) for the specified call mark (1) in step S305. The control unit 210 adds a new record to the book database 221, and registers necessary information in step S306. The control unit 210 prints the management bar code 11 of the management number using the image formation unit 103 based on the registered information in step S307. The control unit 210 prints a label, which includes the call mark (1) and the call mark (3), using the image formation unit 103 in step S308. That is, the control unit 210 forms the image of the management bar code 11 of the management number and the image of the label, which includes the call mark (1) and the call mark (3), using the image formation unit 103 based on the registered information. The created management bar code and the label are attached to the book.

In contrast, when the ISSN is acquired in step S301 (No) and step S309 (Yes), the control unit 210 designates the ISSN and inquires about the bibliography information from the bibliography information storage apparatus 300 in step S310. When the bibliography information is acquired, the control unit 210 numbers the management number in step S311. The control unit 210 adds a new record to the magazine database 222, and registers necessary information in step S312. The control unit 210 prints the management bar code 11 of the management number using the image formation unit 103 in step S313. The control unit 210 prints an in-library use only label using the image formation unit 103 in step S314. The created management bar code and the in-library use only label are attached to the magazine.

Meanwhile, when the ISBN and the ISSN are not acquired in step S301 (No) and step S309 (No), the control unit 210 determines that it is not possible to register the publication, and instructs the image processing apparatus 100 to perform error display in step S315. That is, the determination performed in steps S301 and S309 corresponds to determination which indicates whether or not it is possible to perform publication registration which is the requested process. In this case, the image processing apparatus 100 may be caused to read the cover and the back cover of the publication and to perform an Optical Character Recognition (OCR) process, and the result of the OCR process may be used as the bibliography information.

In addition, in the above-described example, the publication registration and the printing of the management bar code and the label are performed in a series of procedures. However, it is not necessary to perform the publication registration and the printing of the management bar code and the label in a series of procedures, and printing may be performed after, for example, several days or the like after the publication registration is performed.

Lending

Subsequently, the process in step S107 (FIG. 8) performed when the publication is lent will be described with reference to FIG. 10. The control unit 210 of the server apparatus 200 decodes one or more bar codes included in the scan image data and acquires one or more pieces of information. The control unit 210 determines whether or not the pieces of information include a character string indicative of the user ID in step S200. When the user ID is acquired in step S200 (Yes), the control unit 210 compares the acquired user ID with the user ID which is included in the user DB stored in the storage unit 220, and determines whether or not the user is a valid user in step S201. When the user is the valid user in step S201 (Yes), the control unit 210 determines whether or not the pieces of information include a character string indicative of the management number in step S202. When the management number is acquired in step S202 (Yes), the control unit 210 determines whether or not the publication is a book with reference to the management number in step S203. In a case of a book in step S203 (Yes), the control unit 210 reads the book DB 221 in step S204, and updates a lending flag, a user ID, and a lending date for the management number on lending content in step S205.

In contrast, when the control unit 210 determines that the publication is a magazine with reference to the management number in step S203 (No) and in step S206 (Yes), the control unit 210 reads the magazine DB 222 in step S207. When the in-library use only period does not elapse in step S208 (Yes), the control unit 210 updates the lending flag, the user ID, and the lending date for the management number on lending content on non-lending content in step S209. Meanwhile, when it is not possible to acquire the user ID and the management number in step S201 (No) or in step S202 (No), the control unit 210 determines that the publication is not lent, and instructs the image processing apparatus 100 to perform error display in step S210. That is, the determination performed in steps S201 and S209 corresponds to determination whether or not it is possible to perform publication lending which is the requested process.

With regard to the returning of a book or a magazine, the lending flag, the user ID, and the lending date for the management number may be updated on returning content in the same procedures performed when lending is performed.

In addition, when the publication is removed from the database, the control unit 210 of the server apparatus 200 decodes one or more bar codes included in the scan image data and acquires one or more pieces of information. The control unit 210 determines whether or not the pieces of information include the character string indicative of the management number. When the management number is acquired, the control unit 210 removes information corresponding to the management number from the book DB 221 in a case of a book with reference to the management number, and removes information corresponding to the management number from the magazine DB 222 in a case of a magazine with reference to the management number.

Meanwhile, in the example of FIG. 10, authentication is performed based on the user ID after the user selects a desired process (lending or returning). However, a procedure in which the user is first authenticated and then the desired process is selected may be performed. In addition, although the authentication is performed using the medium called the user card, this is only an example. The authentication may be performed in such a way that the user manually inputs the user ID and the password, and any method may be used, if it is possible to determine whether or not the user is a valid user, such as authentication using body information such as the face of the user. In addition, authentication of a normal image processing apparatus as a multi-function machine may be in common with authentication of book management, such as "borrow the publication" and "return the publication".

Second Exemplary Embodiment

Although it is determined whether or not it is possible to perform a requested process based on information specified by codes read from the publication in the first exemplary embodiment, a process to be performed is specified from among plural processes relative to the management of the publication based on information specified by the plural codes read from the publication in a second exemplary embodiment.

Figure 14:
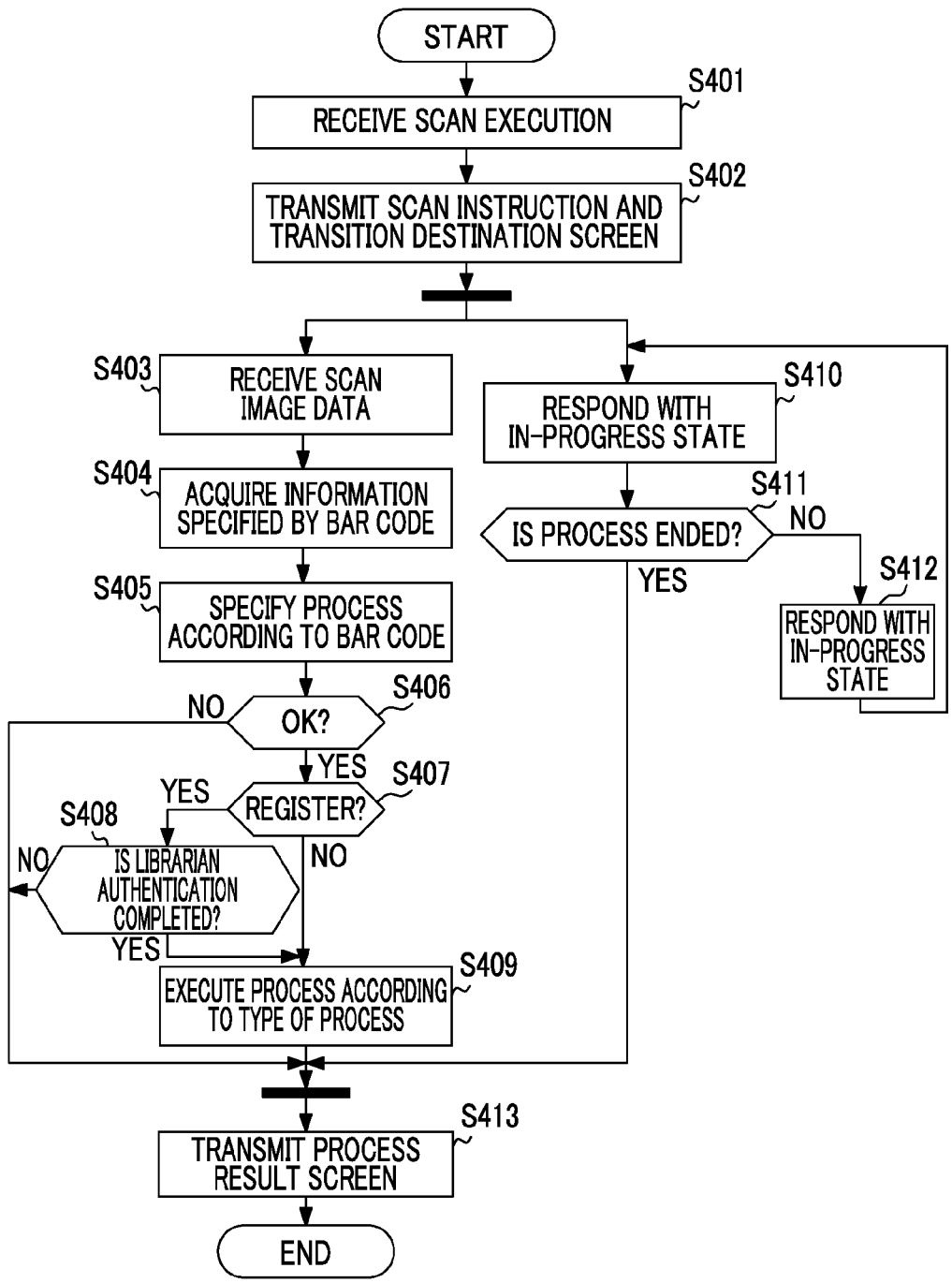
FIG. 14 is a flowchart illustrating the operation of a server apparatus according to a second exemplary embodiment.

FIG. 14 is a flowchart illustrating the operation of a server apparatus 200a according to the second exemplary embodiment. When a publication is registered, a back cover 2 printed with the ISBN bar code 21 of the publication is set on the image reading unit 104 of the image processing apparatus 100, necessary information is input to the input box provided on the registration screen G3, and a soft button on which "OK" is written (hereinafter, refer to an OK button) is selected. In addition, when the publication is lent or returned, the user sets the cover 1 of the publication, to which the management bar code 11 is attached, on the image reading unit 104 of the image processing apparatus 100, and selects the OK buttons of the lending process screen G5 and the returning process screen G6. The identifier of the OK button and information about the value thereof are transmitted to an URL associated by the FORM tags of the HTML on the screens. The control unit 210 of the server apparatus 200a receives a scan instruction by accepting the pieces of information in step S401.

The control unit 210 of the server apparatus 200a transmits the scan instruction and transition destination screen designation information to the image processing apparatus 100 in step S402. The scan instruction includes parameters acquired when scanning is performed and an URL indicative of the destination of scan image data. The transition destination screen designation information is path information such as the URL which means the storage destination of screen data. The control unit 101 of the image processing apparatus 100 reads an image using the image reading unit 104 according to the received scan instruction, and generates image data according to a parameter designated from the server apparatus 200*a*. The control unit 101 transmits the generated image data to a designated destination. The control unit 101 adds meta information (authenticated user information, the address of the image processing apparatus, and the like) to the scan image data in addition to the parameters acquired when scan is performed, if necessary.

The control unit 210 of the server apparatus 200*a* receives the scan image data which is transmitted from the image processing apparatus 100 in step S403. Further, the control unit 210 acquires information which is specified by the bar codes included in the scan image data in step S404. When the plural bar codes are included in the scan image data, the control unit 210 acquires the plural pieces of information which respectively correspond to the bar codes. Further, the control unit 210 specifies a process to be performed using the acquired information in step S405. More specifically, when the ISBN or the ISSN is acquired, the control unit 210 specifies that the process is a publication registration process. In addition, when the management number of the publication is acquired, the control unit 210 specifies that the process is the publication lending or returning process. A method of distinguishing lending and returning is to refer to the lending flag in the book DB 221 or the magazine DB 222, to specify a process as the lending process when lending is not performed, and to specify a process as the returning process when lending is performed. In addition, a position in which the cover of the publication is set on the image processing apparatus 100 may be determined such that a position for lending is different from a position for returning, and both may be distinguished based on the positions. In addition, directions in which the cover and the bar code are set are determined such that a direction for lending is different from a direction for returning, and both may be distinguished based on the directions. In addition, the positional relationship between the cover of the publication and the user card is determined such that the position for lending is different from the position for returning, and both may be distinguished based on the positional relationship.

In addition, when both the ISBN or the ISSN and the management number of the publication are acquired, it may be determined that the publication is an already registered publication, and the process may be specified as the process to lend or return the publication.

When it is possible to specify the process in step S406 (Yes) and the process is the publication registration in step S407 (Yes), the process is subjected to completion of the authentication performed by a librarian in step S408 (Yes), and the control unit 210 executes the registration process in step S409. In addition, when the process is not the publication registration in step S407 (No), the control unit 210 executes the process in step S409. Meanwhile, between steps S403 to S409, the control unit 101 of the image processing apparatus 100 designates a designated URL using transition destination screen designation information, and requests the state display screen from the server apparatus 200*a*. When the process in step S409 is not completed in step S411 (No), the control unit 210 of the server apparatus 200*a* transmits the in-progress screen data (in-progress screen G4 of FIG. 11) to the image processing apparatus 100 in steps S410 and S412. In addition, when the process in step S409 normally ends in step S411 (Yes), the control unit 210 transmits the normal ending screen data (process result screens G7 and G8 of FIG. 12 and process result screen G9 of FIG. 13). When the process in step S409 erroneously ends, the control unit 210 transmits the error screen (process result screens G10, G11, and G12 of FIG. 13) to the image processing apparatus 100 in step S413.

Figure 15:
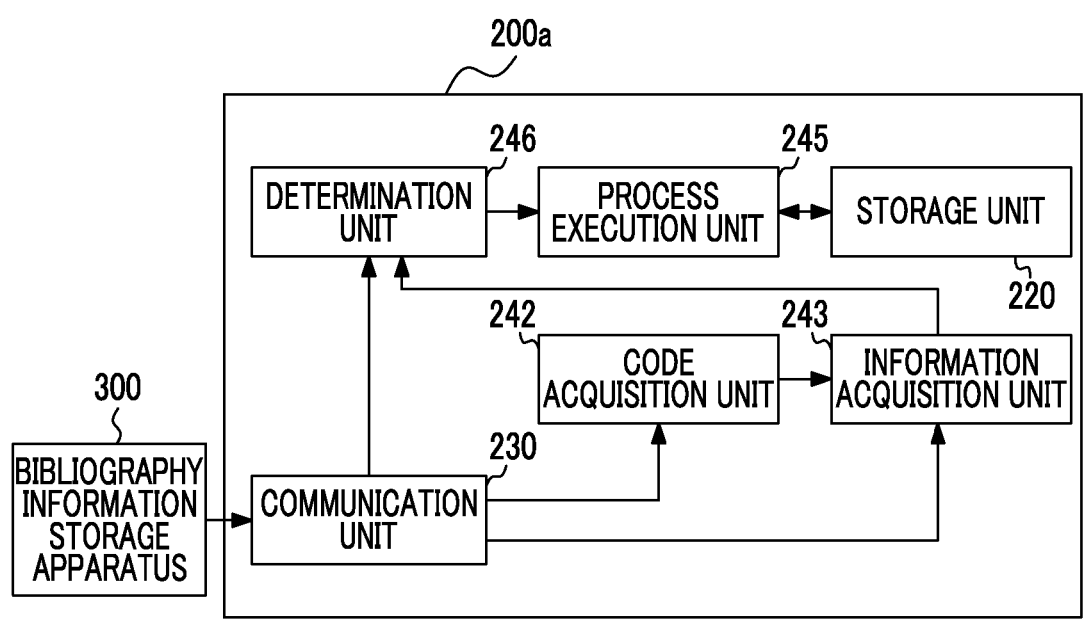
FIG. 15 is a diagram illustrating the functional configuration of the server apparatus according to the second exemplary embodiment.

FIG. 15 is a diagram illustrating the functional configuration of the server apparatus 200*a*. The server apparatus 200*a* includes functions of the communication unit 230, the code acquisition unit 242 that acquires the plural codes affixed to the publication, the information acquisition unit 243 that acquires information specified by the acquired codes, a determination unit 246 that determines whether or not a code corresponding to the process relative to the management of the publication is present from among the acquired codes, the process execution unit 245 that executes the process corresponding to the code when it is determined that the code is present, and the storage unit 220. The code acquisition unit 242, the information acquisition unit 243, the determination unit 246, and the process execution unit 245 are realized by performing the software process of the control unit 210.

According to the above-described exemplary embodiments, it is possible to use the multi-function machine installed in a library as a management terminal and a lending/returning terminal.

Meanwhile, the authentication of the user may be realized using an IC card or a method of living body authentication or the like.

The present invention may be provided in a form of a non-transitory computer readable medium causing a computer to function as the information processing apparatus, or a recording medium which records the non-transitory computer readable medium. In addition, the non-transitory computer readable medium according to the present invention may be downloaded to the computer through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a reception section configured to receive a request for a process relative to management of a publication;
   a code acquisition section configured to acquire a plurality of codes affixed to the publication;
   a determination section configured to determine whether or not a code corresponding to the process is present in the plurality of acquired codes;
   a process execution section configured to execute the process based on the code when it is determined that the code corresponding to the process is present;
   a transmission section configured to execute a character string corresponding to the plurality of acquired codes; and
   an information acquisition section configured to acquire information corresponding to the transmitted character string, wherein the process execution section includes:
a section configured to register the acquired information in a storage section;
a section configured to generate the codes affixed to the publication based on the registered information; and
a section configured to form the generated codes on a medium using an image forming section in response to the acquired information indicating the publication is restricted to a specific location.

2. The information processing apparatus according to claim 1,
wherein the process includes any one of a process to register the publication in a database, a process to update the database in order to lend the publication, and a process to update the database in order to return the lent publication.

3. The information processing apparatus according to claim 2, further comprising:
a transmission section configured to transmit a character string corresponding to the plurality of acquired codes; and
an information acquisition section configured to acquire information corresponding to the transmitted character string,
wherein the process execution section includes:
a section configured to register the acquired information in a storage section;
a section configured to generate the codes affixed to the publication based on the registered information; and
a section configured to form the generated codes on a medium using an image forming section.

4. The information processing apparatus according to claim 2,
wherein the process to update the database to lend the publication includes updating at least one from a lending flag, a user identification, and a lending date, and
wherein the process to update the database to return the lent publication includes updating at least one from the lending flag, the user identification, and a return date.

5. An information processing system comprising:
the information processing apparatus according to claim 1; and
an image processing apparatus that is connected to the information processing apparatus,
wherein the image processing apparatus includes:
an image reading section configured to read a code affixed to the publication; and
an image forming section configured to form an image related to a process executed by the information processing apparatus.

6. The information processing system according to claim 5,
wherein the process includes any one of a process to register the publication in a database, a process to update the database in order to lend the publication, and a process to update the database in order to return the lent publication.

7. The information processing system according to claim 6,
wherein the process to update the database to lend the publication includes updating at least one from a lending flag, a user identification, and a lending date, and
wherein the process to update the database to return the lent publication includes updating at least one from the lending flag, the user identification, and a return date.

8. An information processing apparatus comprising:
a code acquisition section configured to acquire a plurality of codes affixed to a publication;
a determination section configured to determine whether or not a code corresponding to a process relative to management of the publication is present in the plurality of acquired codes;
a process execution section configured to execute the process corresponding to the code when it is determined that the code is present;
a transmission section configured to execute a character string corresponding to the plurality of acquired codes; and
an information acquisition section configured to acquire information corresponding to the transmitted character string,
wherein the process execution section includes:
a section configured to register the acquired information in a storage section;
a section configured to generate the codes affixed to the publication based on the registered information; and
a section configured to form the generated codes on a medium using an image forming section in response to the acquired information indicating the publication is restricted to a specific location.

9. The information processing apparatus according to claim 8,
wherein the process includes any one of a process to register the publication in a database, a process to update the database in order to lend the publication, and a process to update the database in order to return the lent publication.

10. The information processing apparatus according to claim 9, further comprising:
a transmission section that transmits a character string corresponding to the plurality of acquired codes; and
an information acquisition section that acquires information corresponding to the transmitted character string,
wherein the process execution section includes:
a section configured to register the acquired information in a storage section;
a section configured to generate the codes affixed to the publication based on the registered information; and
a section configured to form the generated codes on a medium using an image forming section.

11. The information processing apparatus according to claim 9,
wherein the process to update the database to lend the publication includes updating at least one from a lending flag, a user identification, and a lending date, and
wherein the process to update the database to return the lent publication includes updating at least one from the lending flag, the user identification, and a return date.

12. The information processing apparatus according to claim 8, further comprising:
a transmission section configured to transmit a character string corresponding to the plurality of acquired codes; and
an information acquisition section configured to acquire information corresponding to the transmitted character string,
wherein the process execution section includes:
a section that configured to register the acquired information in a storage section;
a section configured to generate the codes affixed to the publication based on the registered information; and
a section configured to form the generated codes on a medium using an image forming section.

13. A non-transitory computer readable medium causing a computer to function as:

a reception section configured to receive a request for a process relative to management of a publication;

a code acquisition section configured to acquire a plurality of codes affixed to the publication;

a determination section configured to determine whether or not a code corresponding to the process is present in the plurality of acquired codes;

a process execution section configured to execute the process based on the code when it is determined that the code corresponding to the process is present;

a transmission section configured to execute a character string corresponding to the plurality of acquired codes; and an information acquisition section configured to acquire information corresponding to the transmitted character string, wherein the process execution section includes:

a section configured to register the acquired information in a storage section;

a section configured to generate the codes affixed to the publication based on the registered information; and a section configured to form the generated codes on a medium using an image forming section in response to the acquired information indicating the publication is restricted to a specific location.

14. The non-transitory computer readable medium according to claim 13, wherein the process includes any one of a process to register the publication in a database, a process to update the database in order to lend the publication, and a process to update the database in order to return the lent publication.

15. The non-transitory computer readable medium according to claim 14, wherein the process to update the database to lend the publication includes updating at least one from a lending flag, a user identification, and a lending date, and wherein the process to update the database to return the lent publication includes updating at least one from the lending flag, the user identification, and a return date.

16. A non-transitory computer readable medium causing a computer to function as:

a code acquisition section configured to acquire a plurality of codes affixed to a publication;

a process specifying section configured to specify a process relative to management of the publication using the plurality of acquired codes; and a process execution section configured to execute the specified process, a transmission section configured to execute a character string corresponding to the plurality of acquired codes; and an information acquisition section configured to acquire information corresponding to the transmitted character string, wherein the process execution section includes:

a section configured to register the acquired information in a storage section;

a section configured to generate the codes affixed to the publication based on the registered information; and a section configured to form the generated codes on a medium using an image forming section in response to the acquired information indicating the publication is restricted to a specific location.

17. The non-transitory computer readable medium according to claim 16, wherein the process includes any one of a process to register the publication in a database, a process to update the database in order to lend the publication, and a process to update the database in order to return the lent publication.

18. The non-transitory computer readable medium according to claim 17, wherein the process to update the database to lend the publication includes updating at least one from a lending flag, a user identification, and a lending date, and wherein the process to update the database to return the lent publication includes updating at least one from the lending flag, the user identification, and a return date.

* * * * *